Oct. 6, 1964    KOBUN FUJIMOTO ETAL    3,151,943
METHOD FOR PURIFYING EXIT OXYGEN FROM
THE OZONOLYSIS OF FATTY ACIDS
Filed April 3, 1959
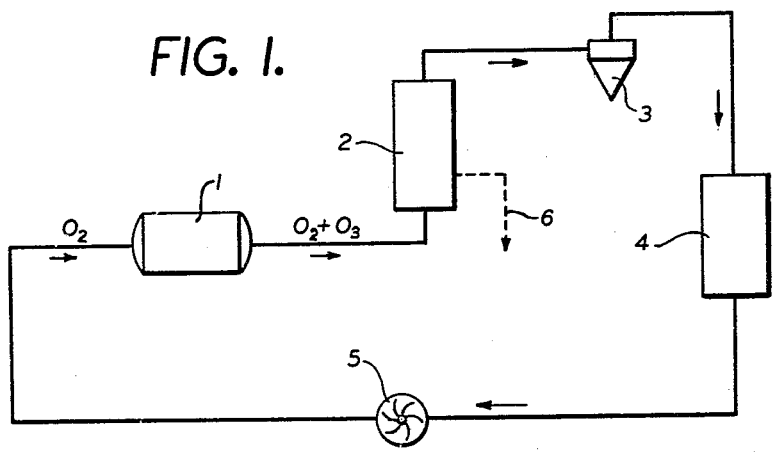
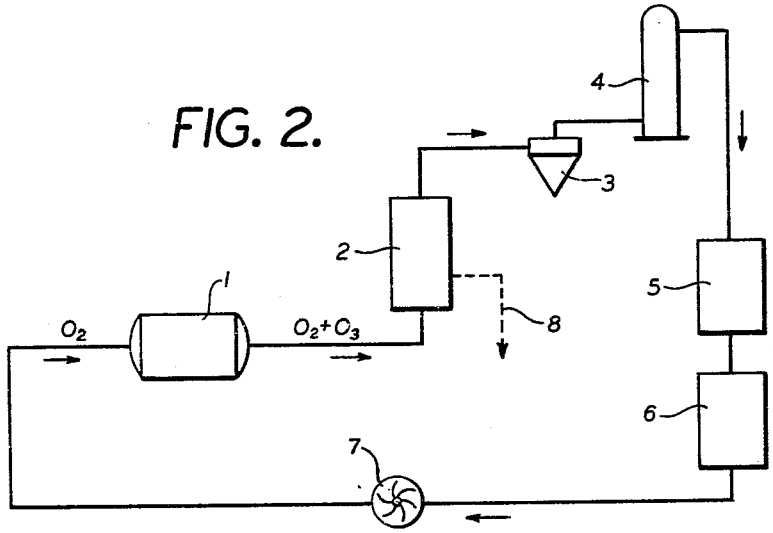
INVENTORS
KOBUN FUJIMOTO
ICHIRO MIWA
SHUGO MORITA
BY
ATTORNEYS.

United States Patent Office 3,151,943
Patented Oct. 6, 1964

3,151,943
METHOD FOR PURIFYING EXIT OXYGEN FROM THE OZONOLYSIS OF FATTY ACIDS
Kobun Fujimoto, Ichiro Miwa, and Shugo Morita, all of Sunagawa, Hokkaido, Japan, assignors to Toyo Koatsu Industries, Incorporated, Tokyo, Japan, a corporation of Japan
Filed Apr. 3, 1959, Ser. No. 803,944
Claims priority, application Japan Apr. 7, 1958
5 Claims. (Cl. 23—221)

This invention relates to a method for purifying exit oxygen withdrawn from an ozonolysis of unsaturated fatty acid with ozonized oxygen to condition the exit oxygen for recycling, and it particularly relates to a method for decomposing the ozone content of said exit oxygen which contains besides oxygen a small amount of ozone and organic vapors, by passing the gas and which has been withdrawn from an ozone absorber through a de-ozonizing device and subsequently through an adsorption device packed with suitable adsorbent, thereby obtaining purified oxygen.

It is well known to manufacture ozone from air or commercial oxygen by means of silent electric discharges. The utilization of electric power in ozone manufacture from commercial oxygen is about twice as favorable as that from air, whereby about twice as much ozone is produced from commercial oxygen as from air, if the ozone concentration and the temperature are kept constant in both cases.

The concentration of ozone produced on commercial scale is about 2% by weight in the manufacture from commercial oxygen and about 1% by weight in the manufacture from air. The limitation to these concentrations is due to economic considerations, because the costs of manufacture are higher at lower concentrations of ozone, as well as at higher concentrations of ozone in the ozonized gas.

In the utilization of air for ozone manufacture and use of the ozonized air for the above mentioned addition reaction, the air discharged from the ozone absorbing device (in which said addition reaction is carried out) is usually disposed of by discharging it into the air. But in the use of ozonized oxygen gas, for economic reasons the oxygen discharged from the ozone absorber cannot be discharged into the atmosphere and must be reused by recycling. In certain special cases, e.g. if the oxygen discharged from the ozone absorber can be utilized in the manufacture of iron and steel, no recycling of the oxygen discharged from the ozone absorber is necessary. However, apart from such special cases, in general it is necessary to utilize the oxygen discharged from the ozone absorber by reintroducing the discharged oxygen into the ozone manufacture. The manufacturing costs of ozone from commercial oxygen gas, with recycling of the oxygen discharged from the ozone absorber amount to about 66% of the costs in the use of ozonized air which is discharged into the atmosphere after its ozone content has been utilized in the ozone absorber of the above mentioned addition reaction. For this reason the use of ozonized oxygen is preferred.

However, in the recycling of oxygen under the above mentioned conditions, the problems of removing organic mist and vapor from the oxygen discharged from the ozone absorber, require most careful consideration. It is known that the ozone addition to unsaturated fatty acids is a violent exothermic reaction. The resulting ozonide is viscous and extremely unstable, and, therefore, usually diluents must be used. Consequently, the exit oxygen from the ozone absorber inevitably contains organic mist and vapor. The presence of these organic substances in the oxygen may cause explosions in the recycling system and, moreover, a considerable lowering in electric power efficiency, which may lead to an utter failure in ozone formation. It has been suggested to solve the problem of removal of organic substances by precipitation of the organic mist from the recycling oxygen by electrostatic precipitation and to remove the vapor by the action of drying agents. However, experience has shown that the danger of explosion could not be safely eliminated in the above outlined manner and the same is true in connection with further suggestions, according to which the organic substances are removed from the oxygen to be recycled by their combustion in the presence of a catalyst or the residual ozone is removed from the oxygen by an adsorbent and the adsorbed ozone is recovered by means of air or nitrogen for further utilization.

It is well known that many drying agents, such as active alumina, silica gel, and active carbon are capable of adsorbing organic substances. We have found that the use of these drying agents is connected with the occurrence of the above mentioned explosions. For example in the recycling system shown in the appended FIG. 1, the oxygen gas containing 2% ozone which has left the ozonizer 1, is brought in contact with unsaturated fatty acids in the ozone absorber 2, in which the ozone content is consumed by an addition reaction. The discharged mixture of oxygen, organic substances and mist and vapor is first passed through a cyclone 3, wherein the mist is caught and separated from the oxygen and is then introduced into a silica gel vessel 4, wherein the vapor is removed so that only the remaining oxygen gas is conducted to the ozonizer 1. Reference numeral 5 indicates a blower and 6 the discharge of the addition product formed in absorber 2, in FIGURE 1.

It has been found that the system diagrammatically shown in FIG. 1 is not safely protected from explosion because explosions may be caused therein by a trace of ozone present in the recycled oxygen. Such explosions may be caused in the silica gel vessel 4 by traces of ozone adsorbed by the silica gel. The oxygen, ozone and the organic substances which have been adsorbed by the silica gel are in a rather concentrated, i.e. condensed state so that a trace of the ozone involved can cause explosion. Unstable organic ozonides and peroxides may very much promote such explosions.

It has been further found that if the exit gas of the ozone absorber contains ozone, the latter leads to a desorption of organic substances which have been adsorbed by the silica gel whereby the desorbed substances are mixed with the recycled oxygen. As an effect of this, the electric power efficiency in the formation of ozone in the ozonizer is reduced to quite a low value and it may often happen that in these circumstances not only the formation of ozone ceases entirely, but the desorbed substances may become attached to the discharge electrode and may cause accidents.

It has been found that it is rather difficult to design and operate an ozone absorber in such a manner that the exit gas discharged from it is completely free from traces of ozone. The ozonides are viscous, oily substances and it takes a long contact time for a complete addition of ozone to the double bond of unsaturated fatty acids and for complete absorption of the ozone from the ozone-containing gas, even if the absorption is carried out in the presence of diluents.

Furthermore, due to a variation in the amount of ozone produced caused by fluctuations in the voltage and the blow-in amount of oxygen, an unbalance between fatty acids and ozone will exist, which is due to fluctuations in the quantity and quality of the unsaturated fatty acids and may be also due to unpredictable influences, such as, for example, a stoppage of operations in the feed system for the unsaturated fatty acids while the blowers and the ozonizer are in operation. It is, therefore, very difficult, or practically impossible, to safely obtain complete exclusion of ozone from the gas entering the silica gel vessel.

It has now been found that the above mentioned difficulties can be safely eliminated according to the present invention by passing the gas discharged from the ozone absorber through a catalyst which comes in contact with the gas to be recycled and has an ozone decomposing effect. Such ozone decomposer, i.e. a vessel which is filled with a suitable catalyst, is inserted in the recycling system prior to the entrance of the recycled gas into the silica gel vessel in order to effect complete decomposition of the ozone in the gas and safely prevent the occurrence of explosions.

Researches about possible catalysts to be used in this invention have proved that oxides of metals such as iron, copper, silver, nickel and peroxides of barium are effective, of which the iron oxides formed by the rusting of iron in the atmosphere are the most excellent viewed from both function and economy. Preparation procedures and properties of them are as follows.

(1) A mild steel tube (16 mm. in inner diameter, 22 mm. in outer diameter, 960 mm. in length) is immersed in the 10% NaOH solution at 100° C. for five hours to remove the oil content attached. In keeping standing in a room for one month after well washed with water, rust forms on its surface. For further one month its inner side is sometimes wetted with water so as to accelerate the formation of the rust. The composition of the rust thus obtained is $FeO \cdot 8Fe_2O_3 \cdot 4H_2O$. In passing the oxygen containing a small amount of ozone through the rusted tube to carry out the contact decomposition of ozone, the following results have been obtained.

| Ozone concentration (percent vol.) | Decomposing temperature (° C.) | Oxygen containing ozone (ml./min.) | Rate of decomposition (percent) |
|---|---|---|---|
| 0.0132 | 60 | 700 | 100 |
| 0.0496 | 60 | 500 | 100 |

(2) Turnings of mild steel are immersed in the 10% NaOH solution at 100° C. for several hours to remove the oil content attached. In keeping standing in a room for ten days with occasional sprayings of water, the rust forms on the surface of the turnings. The composition of the rust thus obtained is $FeO \cdot 7.5Fe_2O_3 \cdot 3.5H_2O$. In passing the oxygen containing a small amount of ozone through a glass tube (16 mm. in inner diameter, 1,000 mm. in length) filed with 120 gr. of those turnings to carry out the contact decomposition of ozone, the following results have been obtained.

| Ozone concentration (percent vol.) | Decomposing temperature (° C.) | Oxygen containing ozone (ml./min.) | Rate of decomposition (percent) |
|---|---|---|---|
| 0.0132 | 20 | 11,000 | 100 |
| 0.0215 | 20 | 11,000 | 100 |
| 0.0496 | 100 | 11,000 | 100 |

(3) 150 gr. of ferrous sulfate ($FeSO_4 \cdot 7H_2O$) is dissolved in 670 ml. of water. Separately 60 gr. of anhydrous sodium carbonate is dissolved in 540 ml. of water. The latter solution is gradually added to the former with strong agitation at a room temperature, whereby a greyish green precipitate is obtained. After keeping the aqueous suspension standing for twenty-four hours, its supernatant solution is separated through decantation. Then, adding water to the precipitate, the aqueous suspension formed is kept standing after agitation; thereafter decantation is applied. Thus, by similar procedures the precipitate is washed with water for ten times, and then it is filtered and dried at a normal pressure and 70° C. for twenty-four hours. Thereafter, the precipitate is further dried under vacuum at 60° C. for twenty-four hours. Thus a black powder is obtained. It has a composition represented mainly by $FeO \cdot xH_2O$ and partly by $$FeO \cdot Fe_2O_3 \cdot yH_2O$$

In passing the oxygen containing a small amount of ozone through a glass tube (380 mm. in length, 10 mm. in inner diameter) filled with 10 gr. of the above iron oxide powder to carry out the contact decomposition of ozone, the following results have been obtained.

| Ozone concentration (percent vol.) | Decomposing temperature (° C.) | Oxygen containing ozone (ml./min.) | Rate of decomposition (percent) |
|---|---|---|---|
| 0.0496 | 20 | 500 | 96.7 |

(4) 150 gr. of ferrous sulfate ($FeSO_4 \cdot 7H_2O$) is dissolved in 670 ml. of water. Separately 60 gr. of anhydrous sodium carbonate is dissolved in 540 ml. of water. Maintaining both solutions at 60° C., the latter solution is gradually added to the former with strong agitation, whereby a brownish colloidal precipitate is obtained. After keeping the aqueous suspension standing for twenty-four hours, its supernatant solution is separated by means of decantation. Then adding water to the precipitate, the aqueous suspension thus formed is kept standing after agitation; thereafter decantation is applied. Thus by similar procedure, the precipitate is washed with water for ten times, and then it is filtered and dried at 70° C. under a normal pressure for twenty-four hours. Thereafter, the precipitate is further dried under vacuum at 60° C. for twenty-four hours. Thus a brownish powder is obtained. It has a composition represented mainly by $$FeO \cdot Fe_2O_3 \cdot xH_2O$$

and partly by $FeO \cdot yH_2O$. In passing the oxygen containing a small amount of ozone through a glass tube (10 mm. in inner diameter, 380 mm. in length) filled with 10 gr. of the above iron oxide powder to carry out the contact decomposition of ozone, the following results have been obtained.

| Ozone concentration (percent vol.) | Decomposing temperature (° C.) | Oxygen containing ozone (ml./min.) | Rate of decomposition (percent) |
|---|---|---|---|
| 0.0496 | 20 | 500 | 96.7 |

(5) 270 gr. of ferric nitrate ($Fe(NO_3)_3 \cdot 9H_2O$) is dissolved in 1.35 litres of water. Separately 110 gr. of anhydrous sodium carbonate is dissolved in 1 litre of water. The latter solution is gradually added to the former with strong agitation at a room temperature, whereby a brownish colloidal precipitate is obtained. As the mixed solution is very much difficult to be settled, the settlement is carried out with the addition of a surface active agent. After keeping the aqueous suspension standing for 24 hours, its supernatant solution is separated by means of decantation. Then adding water to the precipitate, the aqueous suspension thus formed is kept standing after agitation; thereafter decantation is applied. Thus by similar procedure, the precipitate is washed with water for ten times, and then it is filtered and dried at 70° C. under a normal pressure for twenty-four hours. Thereafter, the precipitate is further dried at 70° C. for forty-eight hours (without drying under vacuum). Thus a blackish violet powder is obtained. It has a composition represented by $Fe_2O_3 \cdot xH_2O$. In passing the oxygen containing a small amount of ozone through a glass tube (10 mm. in inner diameter, 380 mm. in length) filled with 10 gr.

of the above iron oxide powder to carry out the contact decomposition of ozone, the following results have been obtained.

| Ozone concentration (percent vol.) | Decomposing temperature (° C.) | Oxygen containing ozone (ml./min.) | Rate of decomposition (percent) |
|---|---|---|---|
| 0.0496 | 20 | 1,000 | 90.0 |
| 0.0496 | 20 | 500 | 100.0 |

(6) In passing the oxygen containing a small amount of ozone through a glass tube (10 mm. in inner diameter, 380 mm. in length) filled with 10 gr. of cupric oxide (CuO) (a chemical reagent), the following results have been obtained.

| Ozone concentration (percent vol.) | Decomposing temperature (° C.) | Oxygen containing ozone (ml./min.) | Rate of decomposition (percent) |
|---|---|---|---|
| 0.0496 | 20 | 500 | 100.0 |

(7) In passing the oxygen containing a small amount of ozone through a glass tube (10 mm. in inner diameter, 380 mm. in length) filled with 10 gr. of silver oxide powder ($Ag_2O$) (a chemical reagent), the following results have been obtained.

| Ozone concentration (percent vol.) | Decomposing temperature (° C.) | Oxygen containing ozone (ml./min.) | Rate of decomposition (percent) |
|---|---|---|---|
| 0.0496 | 20 | 500 | 95.0 |

(8) In passing the oxygen containing a small amount of ozone through a glass tube (10 mm. in inner diameter, 380 mm. in length) filled with 10 gr. of nickelous oxide (NiO) (a chemical reagent), the following results have been obtained.

| Ozone concentration (percent vol.) | Decomposing temperature (° C.) | Oxygen containing ozone (ml./min.) | Rate of decomposition (percent) |
|---|---|---|---|
| 0.0496 | 20 | 500 | 93.3 |

(9) In passing the oxygen containing a small amount of ozone through a glass tube (10 mm. in inner diameter, 380 mm. in length) filled with 10 gr. of barium peroxide ($BaO_2$) (a chemical reagent), the following results have been obtained.

| Ozone concentration (percent vol.) | Decomposing temperature (° C.) | Oxygen containing ozone (ml./min.) | Rate of decomposition (percent) |
|---|---|---|---|
| 0.0496 | 20 | 500 | 93.3 |

Those metallic oxides can be used by themselves, or in a mixture with each other.

The appended FIG. 2 diagrammatically illustrates a system for carrying out the process of the invention.

In this figure, reference numeral 1 denotes the ozonizer into which oxygen gas is introduced and from which the ozonized gas is discharged with a content of about 2% of ozone. This ozonized gas is brought in contact with unsaturated fatty acids in the presence of a diluent in conventional manner in the ozone absorbing vessel 2 in which most of the ozone is chemically bound by an addition reaction with the unsaturated fatty acids. The oxygen gas discharged from ozone absorber 2 contains residual ozone, organic mist and vapor and is then introduced into and passed through the cyclone 3 and subsequently introduced into the washing tower 4 in which a major part of the organic substances are removed. In the washing tower 4, the ascending gas is washed by water. Moreover, due to partial decomposition and/or absorption, the concentration of ozone is reduced in tower 4. The gas discharged from tower 4 is then introduced into the ozone-decomposing vessel 5 which contains the above-mentioned ozone-decomposing catalysts and in which the residual ozone present in the gas is completely decomposed at a temperature in the range of room temperature (15–25° C.) to 100° C., preferably to 70° C. The gas discharged from vessel 5 consists of oxygen and still contains a small amount of organic substances. It is introduced into the silica gel vessel 6 in which the organic substances are completely removed from the oxygen gas by the action of silica gel. The gas discharged from the vessel 6 consists substantially of oxygen only and is then passed to the ozonizer 1 of the recycling system over the blower 7. The ozonide formed in vessel 2 is discharged at 8.

In operating the above described system it may happen that the gas entering the ozone decomposer 5 contains ozone up to 0.1%. However, the ozone decomposer operates so thoroughly that this ozone content is decomposed during passage of the gas through vessel 5.

Example 1

Commercial oleic acid at the rate of 200 kg. per hour having an iodine value of 86 and containing 90% oleic acid, 5% linoleic acid and 5% solid acids, is diluted with a conventional solvent such as a mixed solvent of caproic acid and pelargonic acid with an acid value of 400 and a saponification value of 420 by 600 kg. per hour, and charged into the ozone absorber 2. Simultaneously 32.8 kg. ozone, equivalent to the above iodine value per hour, is charged together with 1640 kg. oxygen into the ozone absorber in parallel or counter current. The exit oxygen discharged from 2 contains about 10 gr. per cubic meter of organic substances and has an ozone content ranging from a trace to 0.02 percent in volume. The exit oxygen is passed through the cyclone 3 and water scrubber 4 consecutively where a major portion of the organic substances contained are removed, and it is then conducted to the ozone decomposer 5 which is filled with iron oxide and wherein the ozone present is completely decomposed into oxygen at about 70° C. The exit oxygen from decomposer 5, which contains no ozone but still contains organic substances, is conducted to the silica gel vessel 6, where the organic substances are removed. The purified oxygen is recycled into the ozonizer.

As a catalyst with which the decomposer is filled is used iron oxide formed on the surface of the turnings of mild steel by rusting it into the atmosphere similar to the aforesaid one. It has a composition represented by $FeO \cdot 10Fe_2O_3 \cdot 2H_2O$.

Example 2

Commercial rice bran fatty acid at the rate of 875 kg. per hour, having an iodine value of 108 is diluted with a conventional diluent e.g. a mixed solvent of caproic acid and pelargonic acid with an acid value of 400 and a saponification value of 420 by 2625 kg. per hour, is charged into the ozone absorber 2. Simultaneously 9,000 kg. oxygen gas containing 180 kg. ozone, equivalent to the above iodine value, is conducted into the ozone absorber. The exit gas thus formed from 2 undergoes the treatments in the ozone decomposer 5 filled with cupric oxide (to be hereafter explained) described in Example 1 and is recycled to the ozonizer.

The catalyst with which the decomposer is filled has been obtained by the following process; a mixture (by equal weight) of diatomaceous earth and the saturated solution of cupric nitrate, which is moulded to tablets (10 mm. in diameter, 10 mm. in length), dried and ignited until a constant weight is reached.

In the appended drawings:

FIG. 1 diagrammatically illustrates a recycling system for ozonizing oxygen according to the state of the art, and FIG. 2 diagrammatically illustrates a recycling system according to the present invention.

The parts and percent stated herein are by weight if not otherwise stated.

In carrying out the invention, instead of silicagel other similarly acting adsorbent agents, e.g. active alumina, active carbon or the like can be used.

What is claimed is:

1. A method for purifying exit oxygen to be recycled in ozonization withdrawn from an ozonolysis of unsaturated fatty acid with ozonized oxygen, comprising in combination the step of passing exit oxygen withdrawn from said ozonolysis and consisting of a small amount of ozone withdrawn from said ozonolysis and organic mist and vapour in addition to oxygen through a de-ozonizing catalyst selected from the group consisting of iron oxides, cupric oxide, silver oxide, nickelous oxide and barium peroxide at a temperature of about 15° C. to 100° C. and the subsequent step of passing the exit oxygen derived from the de-ozonization through at least one adsorbent material selected from the group consisting of silicagel, active alumina, and active carbon to remove said organic mist and vapour.

2. The method as claimed in claim 1, wherein the exit oxygen withdrawn from said ozonolysis and containing a small amount of ozone and organic substances is passed through a cyclone prior to said step of passing the exit oxygen through the catalyst.

3. The method as claimed in claim 1, wherein the exit oxygen withdrawn from said ozonolysis and containing a small amount of ozone and organic substances is passed through a cyclone and then through a water scrubbing step prior to said step of passing the exit gas through the catalyst.

4. The method of claim 1, wherein the temperature for the contacting of the exit oxygen and catalyst is about 15° C.–70° C.

5. A method for purifying exit oxygen gas containing oxygen and as impurities small amounts of ozone and organic matter in mist and vapor form, which exit oxygen gas is withdrawn from an ozonolysis of an unsaturated fatty acid with ozonized oxygen to condition said exit oxygen gas for ozonization, comprising, the step of treating said exit oxygen gas consisting of said small amounts of ozone withdrawn from said ozonolysis, oxygen and said organic matter with a catalyst selected from the group consisting of iron oxides, cupric oxide, silver oxide, nickelous oxide and barium peroxide at a temperature of about 15° C. to 100° C. to catalytically decompose said ozone contained by said exit oxygen, and thereafter contacting said exit oxygen with an adsorbent material capable of adsorbing said organic matter to remove same from said exit oxygen.

References Cited in the file of this patent

UNITED STATES PATENTS

| | | |
|---|---|---|
| 2,490,986 | Symonds | Dec. 13, 1949 |
| 2,582,885 | Rosenblatt | Jan. 15, 1952 |
| 2,700,648 | Thorp et al. | Jan. 25, 1955 |
| 2,809,881 | Grosse et al. | Oct. 15, 1957 |
| 2,857,410 | Thorp et al. | Oct. 21, 1958 |
| 2,874,164 | Hann | Feb. 17, 1959 |

OTHER REFERENCES

Hann in "Chemical Engineering Progress," vol. 51, No. 11, November 1955, pages 523–527.